United States Patent Office 3,100,769
Patented Aug. 13, 1963

3,100,769
DISAZO DYES
Ermanno Gaetani, Milan, Italy, assignor to Aziende Colori Nazionali Affini ACNA S.p.A., Milan, Italy, a corporation of Italy
No Drawing. Filed Apr. 14, 1960, Ser. No. 22,125
Claims priority, application Italy Dec. 15, 1959
5 Claims. (Cl. 260—186)

An object of the present invention is to provide certain new water insoluble disazo dyes having in the general Formula A:

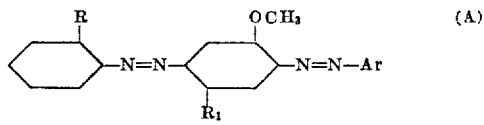

wherein Ar is selected from the group consisting of hydroxyphenyl and hydroxynaphthyl group, which may be substituted with an alkyl group, R is selected from the group consisting of hydrogen and oxymethyl and $R_1$ is selected from the group consisting of methyl and oxymethyl.

The dyes of the above mentioned general Formula A are suitable for the direct dying of polyolefin materials by simple application at the boiling temperature of the dyeing bath.

Among the dyes of general Formula A, the following dyes have shown to be particularly suitable to dye polypropylene and polyethylene materials:

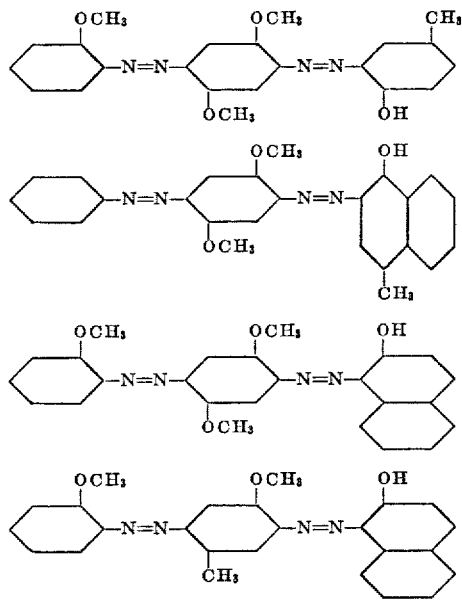

The compounds of general Formula A, are obtained by coupling in the presence of a strong base, one mol of an amino azo compound of the type:

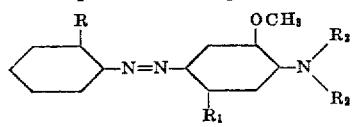

wherein R and $R_1$ have the above mentioned meaning and $R_2$ is hydrogen, with one mol of a compound of the type:

HAr wherein Ar has the above mentioned meaning.

The following examples will further illustrate the present invention however without limiting its scope (all parts are per weight unless otherwise indicated).

*Example 1*

12.3 g. 1-amino-2-methoxy-benzene are diazotised and coupled with a 1-amino-2,5-dimethoxy-azobenzene solution (15.5 g.) in a conventional manner. The aminoazo dye obtained is filtered, washed and dispersed in 300 g. water and 30 g. hydrochloric acid solution, and is then diazotised with a solution of 7 g. sodium nitrite in 30 g. water (at about 10° C.). The diazo-azo compound solution is filtered and coupled with a solution of 12 g. para-methylphenol in 200 g. water and 14 g. of a sodium hydroxide solution (36 Bé), while dropping in at the same time 30 g. of a 30% ammonia solution.

The disazo dye obtained is filtered, washed until it is neutral and dried. This dye consists of a very dark powder (melting point: 164° C.) having the formula:

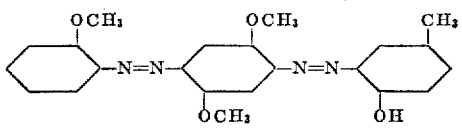

Upon chromatographic examination, a uniform red spot is observed which turns to a bluish shade upon treatment with alkalies and with acids, but this change occurs more slowly with the acids.

*Example 2*

This dye is obtained by operating as described in Example 1 but using 15.5 g. β-naphthol instead of p-methylphenol. The dye obtained, having the formula

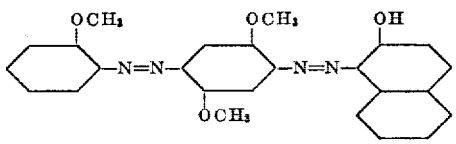

is a bluish powder (melting point 250° C. with decomposition). Upon chromatography a uniform violet spot which remains unaltered with alkalies (the spot is slightly modified to acids) is observed.

*Example 3*

12.3 g. 1-amino-2-methoxy-benzene are diazotised and coupled with a 1-amino-2-methoxy-5-methyl-benzene solution (13.5 g.). The amino-azo dye thus obtained is diazotised and coupled with β-naphthol as described in the preceding examples.

A dye consisting of a bluish powder (melting point 254° C.) and having the following formula is obtained:

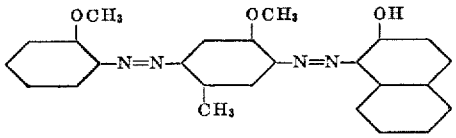

Upon chromatographic examination, a uniform violet spot which does not turn upon contact with acids and alkalies is obtained.

Example 4

29.6 g. 4-amino-2,5-dimethoxy-azobenzene are diazotised in conventional manner and the solution of the diazoazo dye is added (at a temperature below 5° C.) to a solution of 17.5 g. 1-methyl-4-naphthol, while operating as in the preceding examples. The disazo dye obtained, having the formula:

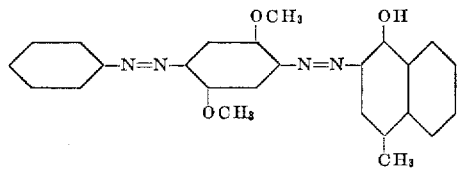

is a bronzy dark powder (melting point 213° C.).

Upon chromatographic examination a uniform violet spot which turns slightly to blue with alkalies and acids is observed.

Having thus described the invention, what I desire to secure and claim by Letters Patent is:

1. A disazo dye, insoluble in water, selected from the group consisting of dyes of the formulae:

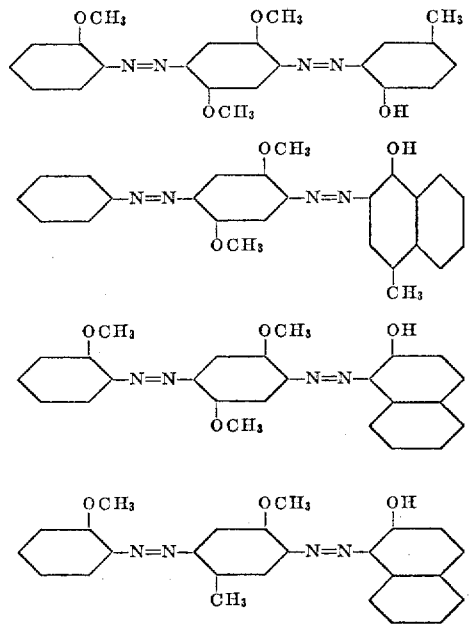

and

2. A disazo dye, insoluble in water, having the following formula:

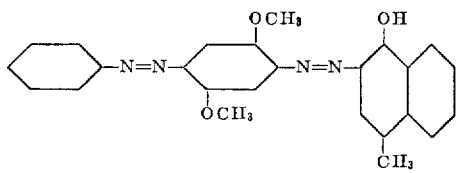

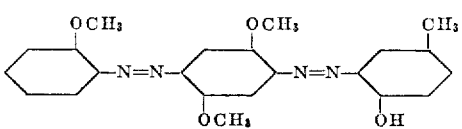

3. A disazo dye, insoluble in water, having the following formula:

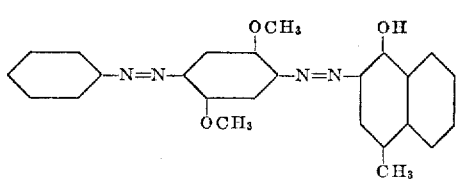

4. A disazo dye, insoluble in water, having the following formula:

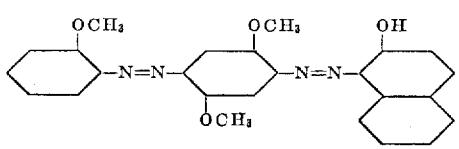

5. A disazo dye, insoluble in water, having the following formula:

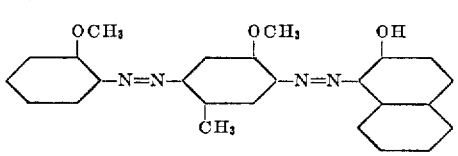

References Cited in the file of this patent

UNITED STATES PATENTS 2,782,185    Merian _____ Feb. 19, 1957

FOREIGN PATENTS 309,183    Switzerland _____ Nov. 1, 1955
311,055    Switzerland _____ Jan. 14, 1956

UNITED STATES PATENT OFFICE
CERTIFICATE OF CORRECTION

Patent No. 3,100,769            August 13, 1963

Ermanno Gaetani

It is hereby certified that error appears in the above numbered patent requiring correction and that the said Letters Patent should read as corrected below.

Column 4, lines 3 to 9, strike out the following formula:

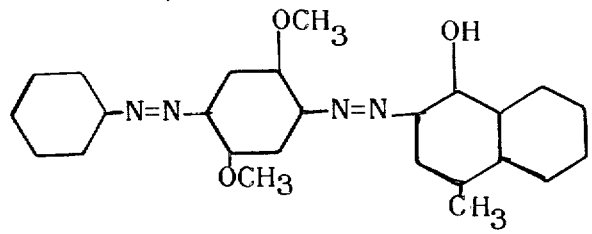

Signed and sealed this 7th day of April 1964.

(SEAL)                                            EDWARD J. BRENNER
Attest:

ERNEST W. SWIDER

Attesting Officer                               Commissioner of Patents